(12) United States Patent
Hokao

(10) Patent No.: US 6,587,679 B1
(45) Date of Patent: Jul. 1, 2003

(54) APPARATUS FOR SCANNING INPUT SIGNALS IN WIRELESS TELEPHONE AND METHOD OF DOING THE SAME

(75) Inventor: Tomoaki Hokao, Tokyo (JP)

(73) Assignee: NEC Corporation, Toyko (JP)

( * ) Notice: Subject to any disclaimer, the term of this patent is extended or adjusted under 35 U.S.C. 154(b) by 0 days.

(21) Appl. No.: 09/212,094

(22) Filed: Dec. 15, 1998

(30) Foreign Application Priority Data

Dec. 15, 1997 (JP) ............................ 9-344599

(51) Int. Cl.⁷ ............................ H04B 1/16; H04M 1/00
(52) U.S. Cl. .................... 455/343; 455/574; 455/161.1
(58) Field of Search .......................... 455/161.1, 161.2, 455/434, 515, 67.1, 343, 574

(56) References Cited

U.S. PATENT DOCUMENTS 5,301,225 A * 4/1994 Suzuki et al. ............... 455/574
5,627,882 A * 5/1997 Chien et al. ................. 455/574

FOREIGN PATENT DOCUMENTS

| EP | 0 279 697 | 8/1988 |
| JP | 63-103523 | 5/1988 |
| JP | 3-239024 | 10/1991 |
| JP | 4-241528 | 8/1992 |
| JP | 4-304043 | 10/1992 |
| JP | 6-338838 | 12/1994 |
| JP | 7-254872 | 10/1995 |
| JP | 8-19041 | 1/1996 |
| JP | 8-46563 | 2/1996 |

OTHER PUBLICATIONS

Australia Office Action, dated Feb. 14, 2002.

* cited by examiner

Primary Examiner—Vivan Chin
Assistant Examiner—Eliseo Ramos-Feliciano
(74) Attorney, Agent, or Firm—Scully, Scott, Murphy & Presser (57) ABSTRACT

There is provided an apparatus for scanning signals received by a wireless telephone, including (a) a monitor having a first monitor mode where an input signal received through an antenna is monitored at every first period of time and a second monitor mode where the input signal is monitored at every second period of time longer than the first period of time, (b) a mode-keeper for, while the monitor is set in the first monitor mode, keeping the monitor in the first monitor mode when the input signal is monitored in a third period of time longer than the first period of time, and (c) a mode-changer for, while the monitor is set in the first monitor mode, changing the first monitor mode to the second monitor mode when the input signal is not monitored in the third period of time. In accordance with the above-mentioned apparatus, the first monitor mode is kept established when an input signal is monitored, even if the monitored input signal has a level smaller than a threshold level, and the second monitor mode such as a power saving mode is changed to the first monitor mode when an input signal is monitored while the second monitor mode is established. As a result, it is possible to shorten a period of time necessary for receiving input signals when the apparatus is put into a condition for rapidly receiving input signals.

10 Claims, 6 Drawing Sheets

FIG. 1

PRIOR ART

FIG. 2

PRIOR ART

APPARATUS FOR SCANNING INPUT SIGNALS IN WIRELESS TELEPHONE AND METHOD OF DOING THE SAME

BACKGROUND OF THE INVENTION

1. Field of the Invention

The invention relates to an apparatus for scanning signals received by a wireless telephone, and further to a method of doing the same.

2. Description of the Related Art

Figure 1:
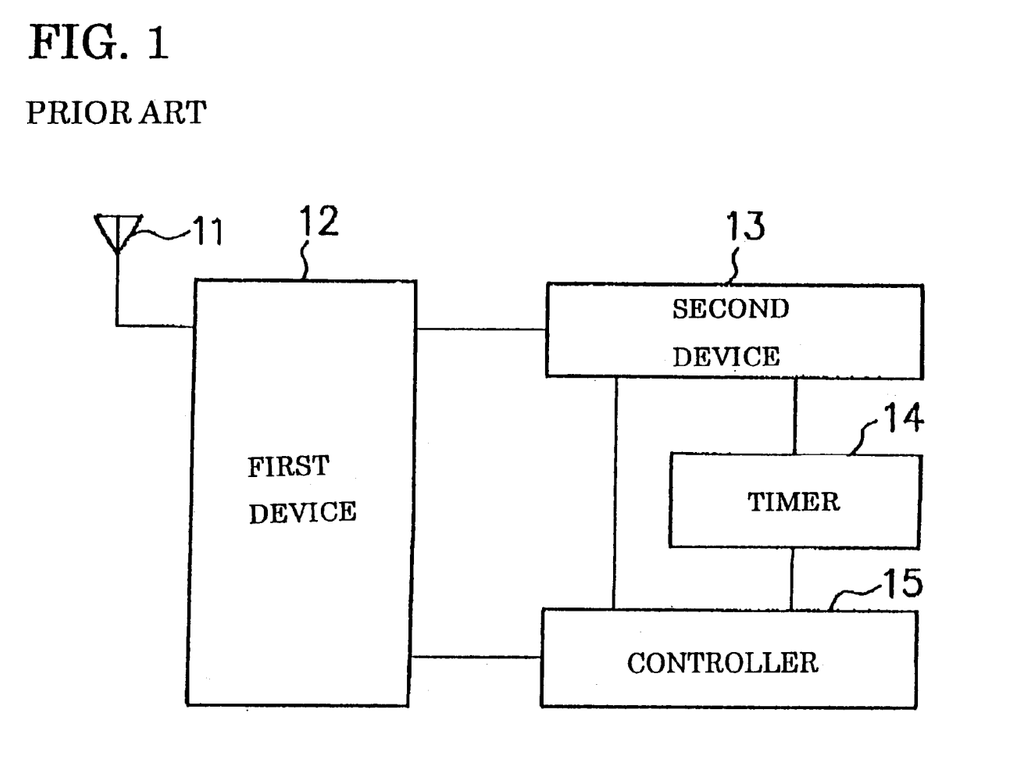
FIG. 1 is a block diagram of a conventional apparatus for scanning signals received by a wireless telephone.

FIG. 1 illustrates a conventional apparatus for scanning signals received by a wireless telephone. The illustrated apparatus is comprised of an antenna 11, a first device 12 for transmitting and receiving radio signals, to which the antenna is connected, a second device 13 for judging a level of a received signal, a timer 14, and a controller 15.

The first device 12 receives and transmits radio signals through the antenna 11. The second device 13 judges whether a radio signal received by the first device 12 has a level smaller than a threshold level. The controller 15 controls an operation of the first device 12 in accordance with output signals transmitted from the second device 13 and output signals transmitted from the timer 14.

The apparatus illustrated in FIG. 1 operates as follows.

Figure 2:
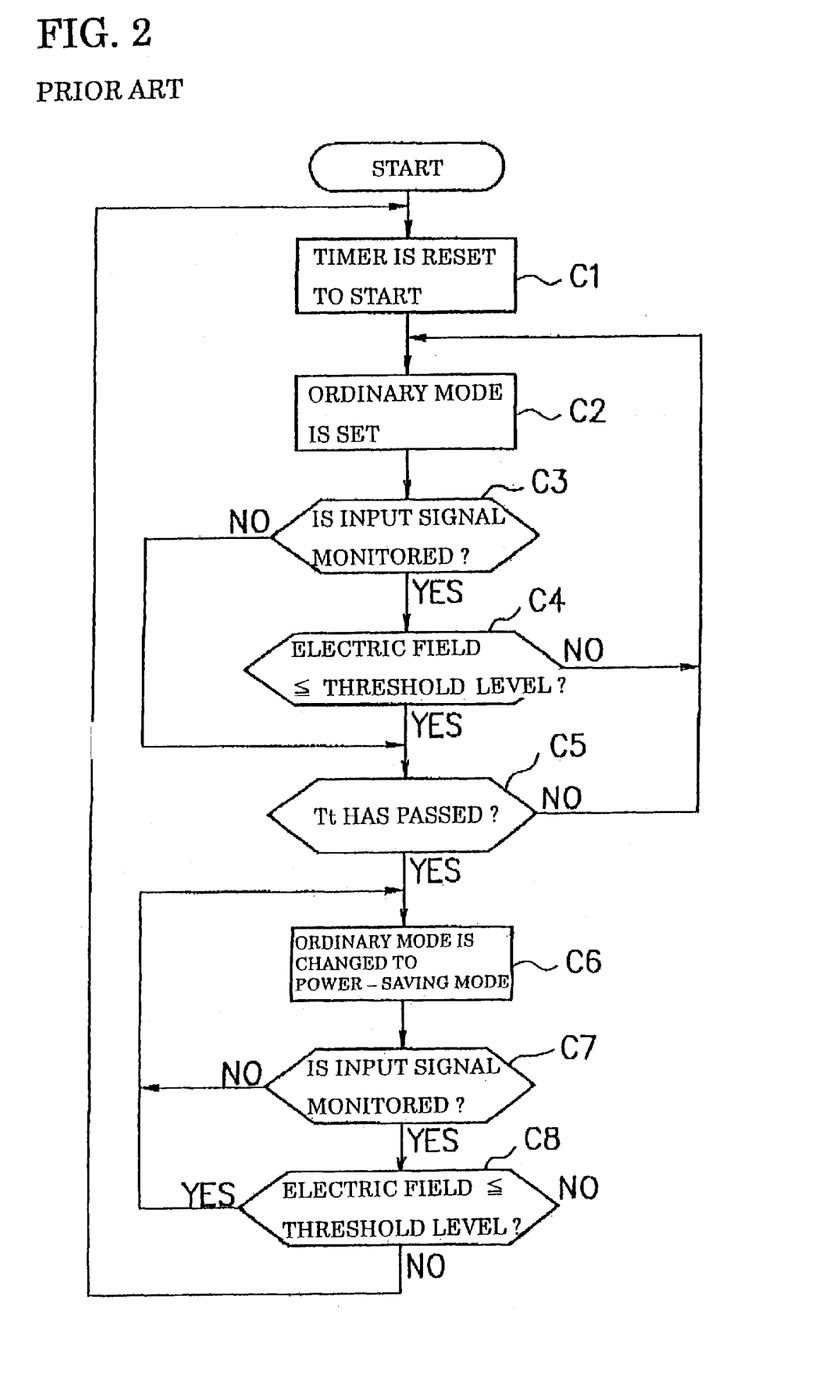
FIG. 2 is a flow chart showing an operation of the conventional apparatus for scanning signals received by a wireless telephone, illustrated in FIG. 1.

With reference to FIG. 2, the timer 14 is reset to thereby be made to start in step C1.

Then, the first device 12 establishes an ordinary mode where an input signal is monitored at every period of time Tn, in step C2.

Then, the controller 15 judges whether an input signal received through the antenna 11 is monitored, in step C3. When an input signal is monitored in step C3, the second device 13 judges whether an electric field of the monitored input signal has a level smaller than a threshold level, in step C4.

If an electric field of the monitored input signal is judged not to have a level smaller than the threshold level, the ordinary mode is kept established in step C2. If an electric field of the monitored input signal is judged to have a level smaller than the threshold level, the controller 15 judges whether a period of time Tt longer than the period of time Tn (Tt>Tn) has passed or not in accordance with output signals transmitted from the timer 14, in step C5.

When the period of time Tt has not passed yet, step C2 and the subsequent steps are carried out again. When an input signal received through the antenna 11 is not monitored in step C3, step C4 is skipped, and step C5 is carried out.

When the period of time Tt has passed, the first device 12 has established a power-saving mode where an input signal is monitored at every period of time Ts (Ts>Tn), in step C6.

Then, the controller 15 judges whether an input signal received through the antenna 11 is monitored or not, in step C7. If an input signal is not monitored in step C7, the power-saving mode is kept established in step C6.

When an input signal is monitored in step C7, the second device 13 judges whether the an electric field of monitored input signal has a level equal to or smaller than a threshold level, in step C8.

If an electric field of the monitored input signal is judged in step C8 to have a level equal to or smaller than the threshold level, the power-saving mode is kept established in step C6. If an electric field of the monitored input signal is judged in step C8 not to have a level equal to or smaller than the threshold level, step C1 is carried out again, and then, the power-saving mode is changed into the ordinary mode in step C2.

Hereinbelow is explained an operation of the conventional apparatus for scanning signals received by a wireless telephone, illustrated in FIG. 1.

Figure 3:
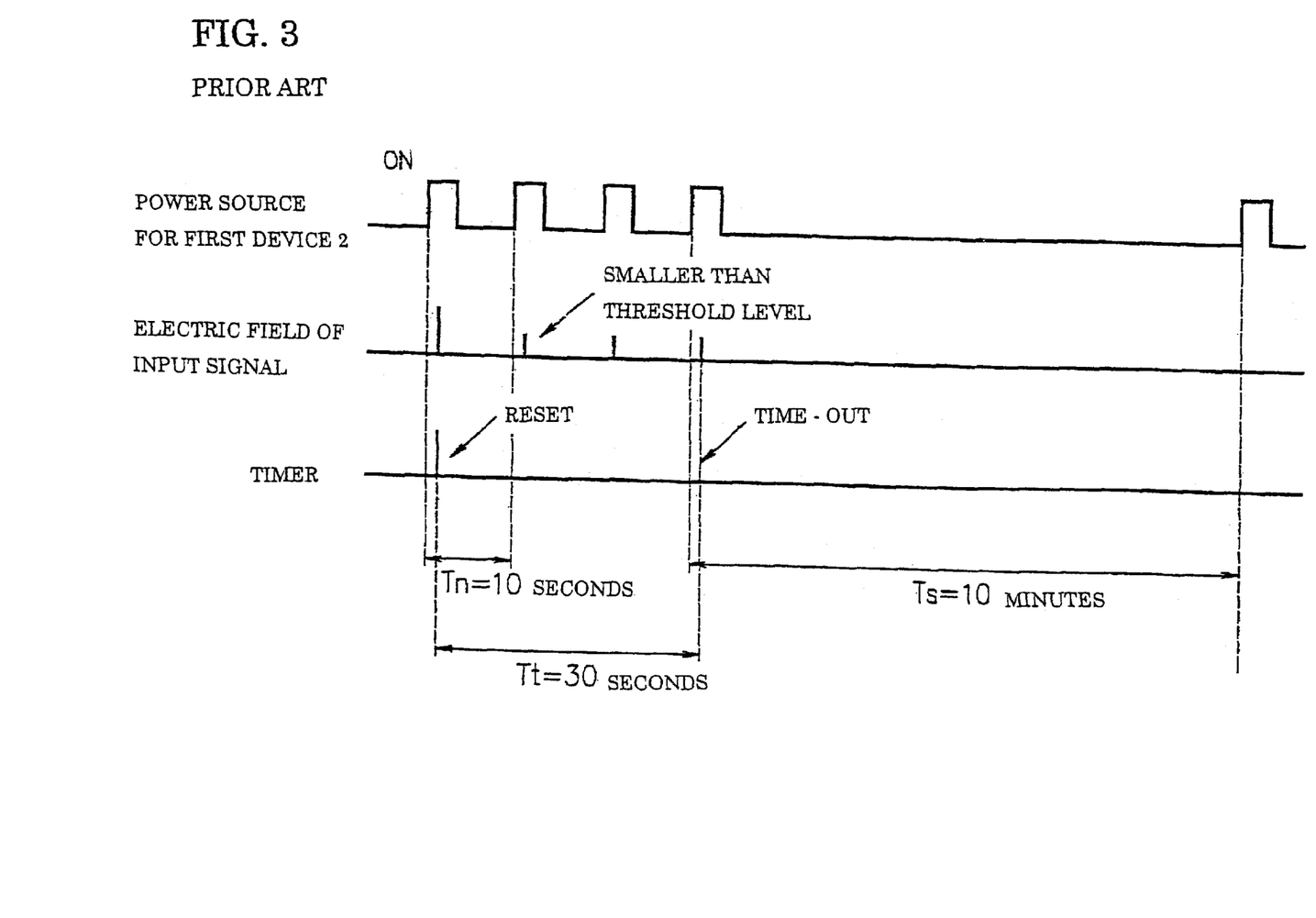
FIG. 3 illustrates waveforms of signals in the conventional apparatus for scanning signals received by a wireless telephone, illustrated in FIG. 1.

As illustrated in FIG. 3, an input signal is first scanned in the ordinary mode where a signal is scanned at every period of time Tn which is set to be 10 seconds. Even if an input signal is monitored, when a period of time Tt which is set to be 30 seconds has passed, the ordinary mode is switched into the power-saving mode where a signal is scanned at every period of time Ts which is set to be 10 minutes, if an electric field of the monitored input signal has a level equal to or smaller than a threshold level which is set to be 26 dB $\mu$V.

In the above-mentioned conventional apparatus for scanning signals received by a wireless telephone, if a predetermined period of time during which an electric field of a monitored input signal has a level equal to or smaller than a threshold level has passed, the ordinary mode having a shorter interval between scanning is changed into the power-saving mode having a longer interval between scanning. Hence, there is paused a problem that it would take much time for receiving an input signal, because the ordinary mode is changed into the power-saving mode even in a case that an input signal has to be shortly received.

The above-mentioned conventional apparatus for scanning signals received by a wireless telephone is accompanied with another problem that it would take much time for receiving an input signal due to a long interval between scanning, even if the apparatus moves to a location where an input signal can be received, after the power-saving mode has been once established.

Japanese Unexamined Patent Publication No. 4-241528 having been published on Aug. 28, 1992 has suggested a mobile communication terminal comprising a judgement circuit for measuring an intensity of an electric field of signals received from a radio base station, and judging whether the intensity of an electric field is going to increase or decrease, based on the measurement results, and a control circuit for varying an interval by which signals are intermittently received, in accordance with the result of judgement of the judgement circuit. The intensity of an electric field of the received signals is smaller than a threshold value and is going to decrease, an interval by which signals are intermittently received is made shorter. The intensity of an electric field of the received signals is greater than a threshold value and is going to increase, an interval by which signals are intermittently received is made longer.

Japanese Unexamined Patent Publication No. 6-338838 having been published on Dec. 6, 1994 has suggested a digitally modulated, codeless telephone having a parent phone and a child phone. The suggested telephone is comprised of a first timer for measuring time until a receiving section of the child phone becomes stable after the receiving section is turned on for intermittently receiving signals, a data width detector for judging whether a width of received data is effective or not, a second timer for measuring time necessary for judging received data is transmitted from the parent phone, and an identifier for identifying whether received data is transmitted from the parent phone while the second timer measures the time.

Japanese Unexamined Patent Publication No. 7-254872 having been published on Oct. 3, 1995 has suggested a controller for controlling a main power source of a digital mobile terminal. The controller is comprised of a timer for turning off a main power source when the mobile terminal stays by a certain period of time in an area where the mobile terminal cannot make communication with a base station, a back-up device for allowing the timer to measure time by a certain period of time after the power source has been turned off, and a second power source. When the timer has measured time by a certain period of time, the second power source transmits a signal to the main power source to thereby turn the main power source on.

Japanese Unexamined Patent Publication No. 8-19041 having been published on Jan. 19, 1996 has suggested a codeless telephone including a parent phone and a child phone. The child phone is comprised of a control channel detector for detecting a timing at which a control channel is transmitted from the parent phone, a timing generator for determining a timing at which a control signal is received and a response signal is transmitted, based on the timing at which a control channel is transmitted from the parent phone, and a controller for controlling a power source which supplies power to a signal transmitter and a signal receiver.

Japanese Unexamined Patent Publication No. 8-46563 having been published on Feb. 16, 1996 has suggested a method of controlling a car telephone system. In the system, a first period of time during which a car stays out of a service area is measured, and then, a second period of time for carrying out out-of-area process, based on the measured first period of time. Thus, an interval between channel scanning is varied.

However, the apparatuses or methods suggested in above-mentioned Publications are accompanied with the same problem as that of the apparatus having been described with reference to FIGS. 1 to 3.

SUMMARY OF THE INVENTION

In view of the above-mentioned problems, it is an object of the present invention to provide both an apparatus for scanning signals received by a wireless telephone and a method of doing the same, both of which can shorten a period of time necessary for the apparatus to receive input signals when the apparatus is put into a condition where the apparatus can rapidly receive input signals.

In one aspect of the present invention, there is provided an apparatus for scanning signals received by a wireless telephone, including (a) a monitor having a first monitor mode where an input signal received through an antenna is monitored at every first period of time and a second monitor mode where the input signal is monitored at every second period of time longer than the first period of time, (b) a mode keeper for, while the monitor is set in the first monitor mode, keeping the monitor in the first monitor mode when the input signal is monitored in a third period of time longer than the first period of time, and (c) a mode changer for, while the monitor is set in the first monitor mode, changing the first monitor mode to the second monitor mode when the input signal is not monitored in the third period of time.

There is further provided an apparatus for scanning signals received by a wireless telephone, including (a) a monitor having a first monitor mode where an input signal received through an antenna is monitored at every first period of time and a second monitor mode where the input signal is monitored at every second period of time longer than the first period of time, (b) a first mode keeper for, while the monitor is set in the first monitor mode, keeping the monitor in the first monitor mode when the input signal is monitored in a third period of time longer than the first period of time and when the input signal has a level equal to or greater than a threshold level, (c) a second mode keeper for, while the monitor is set in the first monitor mode, keeping the monitor in the first monitor mode when the input signal is monitored in the third period of time, and (d) a mode changer for, while the monitor is set in the first monitor mode, changing the first monitor mode to the second monitor mode when the input signal is not monitored in the third period of time.

There is still further provided an apparatus for scanning signals received by a wireless telephone, including (a) a monitor having a first monitor mode where an input signal received through an antenna is monitored at every first period of time and a second monitor mode where the input signal is monitored at every second period of time longer than the first period of time, and (b) a mode changer for, while the monitor is set in the second monitor mode, changing the second monitor mode to the first monitor mode when the input signal is monitored in the second period of time.

There is yet further provided an apparatus for scanning signals received by a wireless telephone, including (a) a monitor having a first monitor mode where an input signal received through an antenna is monitored at every first period of time and a second monitor mode where the input signal is monitored at every second period of time longer than the first period of time, (b) a mode keeper for, while the monitor is set in the first monitor mode, keeping the monitor in the first monitor mode when the input signal is monitored in a third period of time longer than the first period of time, (c) a first mode changer for, while the monitor is set in the first monitor mode, changing the first monitor mode to the second monitor mode when the input signal is not monitored in the third period of time, and (d) a second mode changer for, while the monitor is set in the second monitor mode, changing the second monitor mode to the first monitor mode when the input signal is monitored in the second period of time.

In another aspect of the present invention, there is provided a method of scanning signals received by a wireless telephone, including the steps of (a) establishing a first monitor mode where an input signal received through an antenna is monitored at every first period of time, (b) keeping the first monitor mode, while the first monitor mode is established, when the input signal is monitored in a second period of time longer than the first period of time, and (c) changing the first monitor mode to a second monitor mode where the input signal is monitored in a third period of time longer than the first period of time, while the first monitor mode is established, when the input signal is not monitored in the second period of time.

There is further provided a method of scanning signals received by a wireless telephone, including the steps of (a) establishing a first monitor mode where an input signal received through an antenna is monitored at every first period of time, (b) keeping the first monitor mode, while the first monitor mode is established, when the input signal is monitored in a second period of time longer than the first period of time, (c) changing the first monitor mode to a second monitor mode where the input signal is monitored in a third period of time longer than the first period of time, while the first monitor mode is established, when the input signal is not monitored in the second period of time, and (d) changing the second monitor mode to the first monitor mode, while the second monitor mode is established, when the input signal is monitored in the third period of time.

In still another aspect of the present invention, there is provided a recording medium readable by a computer, storing a program therein for causing a computer to act as an apparatus for scanning signals received by a wireless telephone, the apparatus including (a) a monitor having a first monitor mode where an input signal received through an antenna is monitored at every first period of time and a second monitor mode where the input signal is monitored at every second period of time longer than the first period of time, (b) a mode keeper for, while the monitor is set in the first monitor mode, keeping the monitor in the first monitor mode when the input signal is monitored in a third period of time longer than the first period of time, and (c) a mode changer for, while the monitor is set in the first monitor mode, changing the first monitor mode to the second monitor mode when the input signal is not monitored in the third period of time.

There is further provided a recording medium readable by a computer, storing a program therein for causing a computer to act as an apparatus for scanning signals received by a wireless telephone, the apparatus including (a) a monitor having a first monitor mode where an input signal received through an antenna is monitored at every first period of time and a second monitor mode where the input signal is monitored at every second period of time longer than the first period of time, (b) a first mode keeper for, while the monitor is set in the first monitor mode, keeping the monitor in the first monitor mode when the input signal is monitored in a third period of time longer than the first period of time and when the input signal has a level equal to or greater than a threshold level, (c) a second mode keeper for, while the monitor is set in the first monitor mode, keeping the monitor in the first monitor mode when the input signal is monitored in the third period of time, and (d) a mode changer for, while the monitor is set in the first monitor mode, changing the first monitor mode to the second monitor mode when the input signal is not monitored in the third period of time.

There is still further provided a recording medium readable by a computer, storing a program therein for causing a computer to act as an apparatus for scanning signals received by a wireless telephone, the apparatus including (a) a monitor having a first monitor mode where an input signal received through an antenna is monitored at every first period of time and a second monitor mode where the input signal is monitored at every second period of time longer than the first period of time, and (b) a mode changer for, while the monitor is set in the second monitor mode, changing the second monitor mode to the first monitor mode when the input signal is monitored in the second period of time.

There is yet further provided a recording medium readable by a computer, storing a program therein for causing a computer to act as an apparatus for scanning signals received by a wireless telephone, the apparatus including (a) a monitor having a first monitor mode where an input signal received through an antenna is monitored at every first period of time and a second monitor mode where the input signal is monitored at every second period of time longer than the first period of time, (b) a first mode keeper for, while the monitor is set in the first monitor mode, keeping the monitor in the first monitor mode when the input signal is monitored in a third period of time longer than the first period of time, (c) a first mode changer for, while the monitor is set in the first monitor mode, changing the first monitor mode to the second monitor mode when the input signal is not monitored in the third period of time, and (d) a second mode changer for, while the monitor is set in the second monitor mode, changing the second monitor mode to the first monitor mode when the input signal is monitored in the second period of time.

There is still yet further provided a recording medium readable by a computer, storing a program therein for causing a computer to carry out a method of scanning signals received by a wireless telephone, the method including the steps of (a) establishing a first monitor mode where an input signal received through an antenna is monitored at every first period of time, (b) keeping the first monitor mode, while the first monitor mode is established, when the input signal is monitored in a second period of time longer than the first period of time, and (c) changing the first monitor mode to a second monitor mode where the input signal is monitored in a third period of time longer than the first period of time, while the first monitor mode is established, when the input signal is not monitored in the second period of time.

There is further provided a recording medium readable by a computer, storing a program therein for causing a computer to carry out a method of scanning signals received by a wireless telephone, the method including the steps of (a) establishing a first monitor mode where an input signal received through an antenna is monitored at every first period of time, (b) keeping the first monitor mode, while the first monitor mode is established, when the input signal is monitored in a second period of time longer than the first period of time, (c) changing the first monitor mode to a second monitor mode where the input signal is monitored in a third period of time longer than the first period of time, while the first monitor mode is established, when the input signal is not monitored in the second period of time, and (d) changing the second monitor mode to the first monitor mode, while the second monitor mode is established, when the input signal is monitored in the third period of time.

In accordance with the present invention, the first monitor mode is kept established when an input signal is monitored in a certain period of time, even if the monitored input signal has a level smaller than a threshold level, and the second monitor mode such as a power-saving mode is changed to the first monitor mode when an input signal is monitored while the second monitor mode is established. As a result, it is possible to shorten a period of time necessary for receiving input signals when the apparatus is put into a condition for rapidly receiving input signals.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 4:
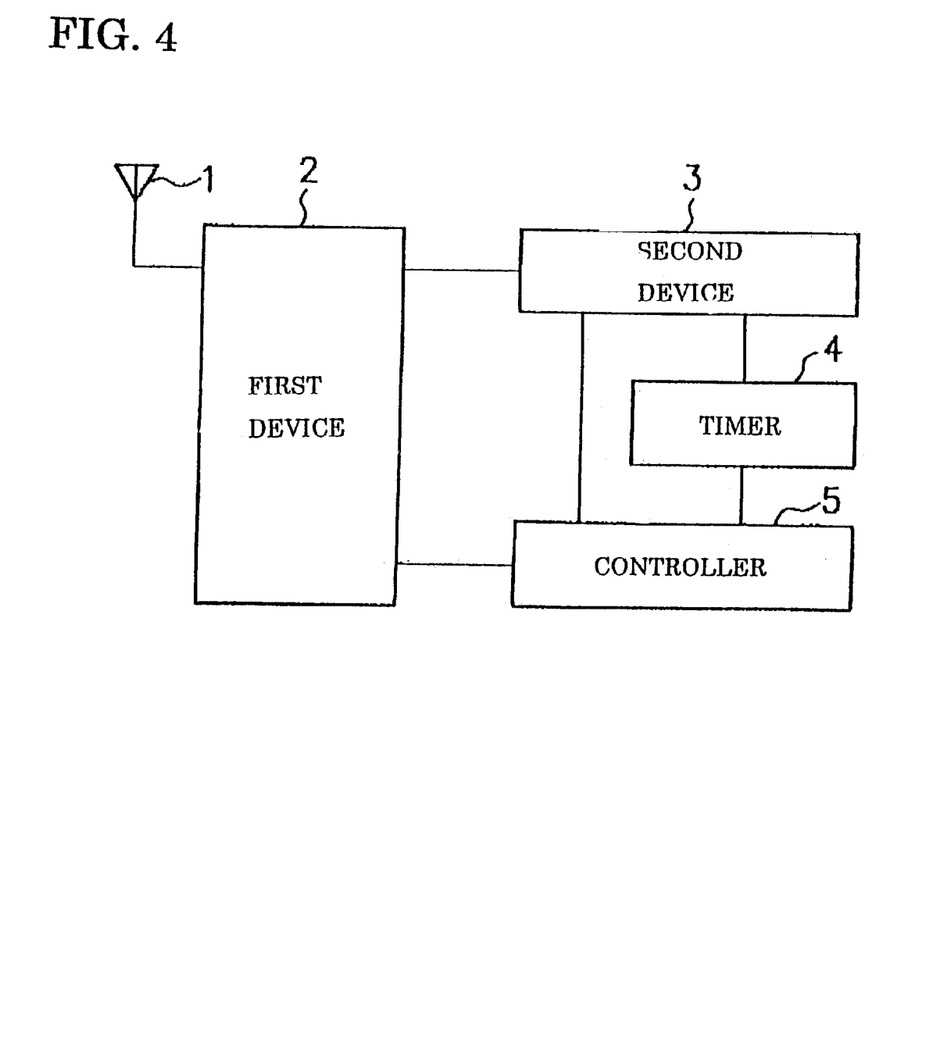
FIG. 4 is a block diagram of an apparatus for scanning signals received by a wireless telephone, in accordance with an embodiment of the present invention.

FIG. 4 illustrates an apparatus for scanning signals received by a wireless telephone, in accordance with an embodiment of the present invention. The illustrated apparatus is comprised of an antenna 1, a first device 2 for transmitting and receiving radio signals, connected to the antenna 1, a second device 3 for judging a level of a receive radio signal, connected to the first device 2, a timer 4 connected to the second device 3, and a controller 5 connected to the first device 2, the second device 3, and the timer 4.

The first device 2 makes communication in radio signals with a base station (not illustrated). The timer 4 measures a period of time in which the first device 2 receives no radio signals. The controller 5 controls the first device 2 in accordance with output signals transmitted from both the second device 3 and the timer 4.

In the present embodiment, the controller 5 acts as a mode keeper, a mode changer, a first mode keeper, a second mode keeper, a first mode changer, and a second mode changer. However, it should be noted that a mode keeper, a mode changer, a first mode keeper, a second mode keeper, a first mode changer, and a second mode changer might be separately formed. As an alternative, some of them may be formed in a single unit. For instance, a mode keeper, a first mode keeper, and a second mode keeper may be formed as a single unit for keeping the apparatus in a certain mode.

An operation of the apparatus illustrated in FIG. 4 is explained hereinbelow with reference to FIG. 5.

Figure 5:
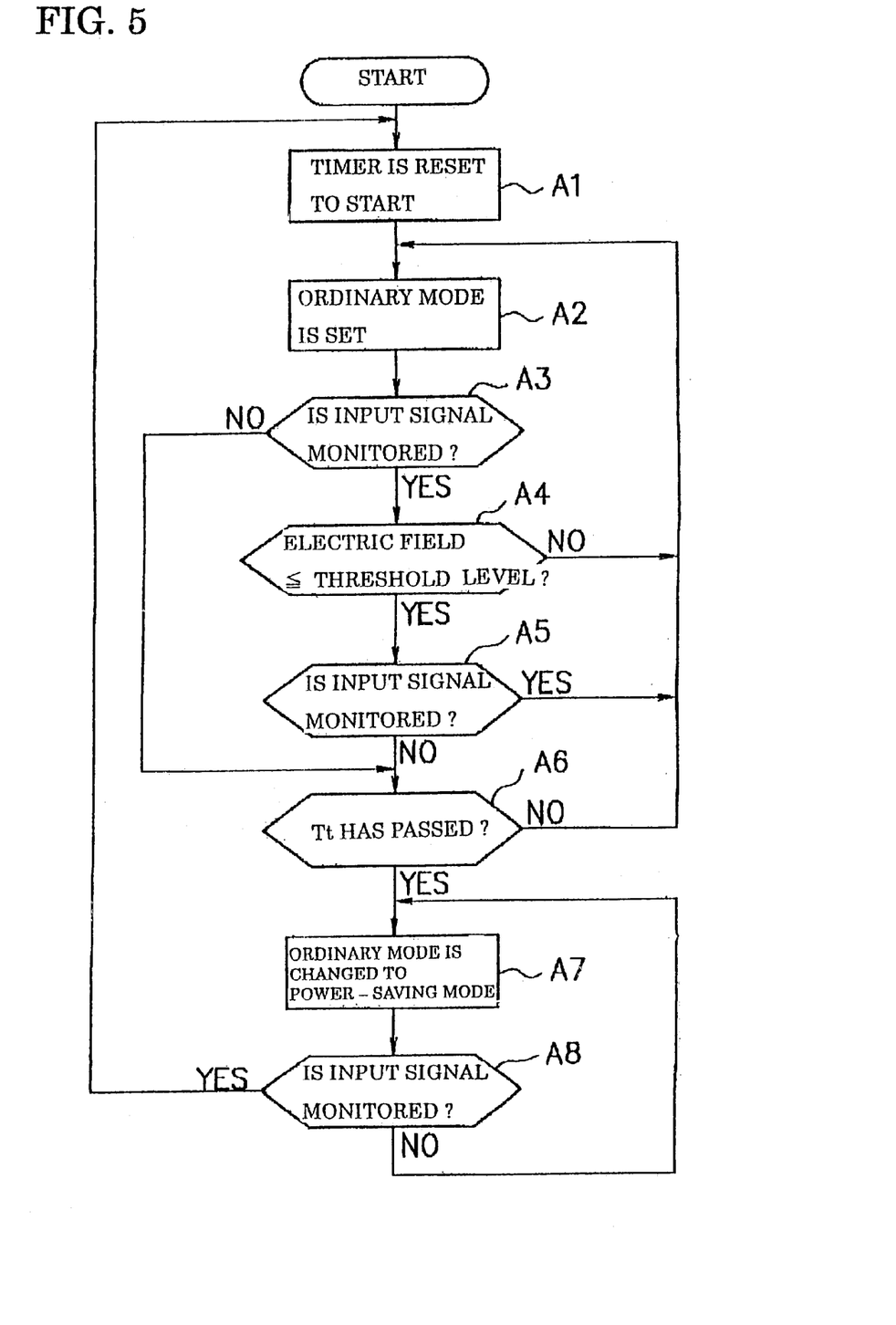
FIG. 5 is a flow chart showing an operation of the apparatus for scanning signals received by a wireless telephone, illustrated in FIG. 4.

As illustrated in FIG. 5, the timer 4 is reset to thereby be made to start in step A1.

Then, the first device 2 is put in an ordinary mode where an input signal is monitored at every period of time Tn, in step A2.

Then, the controller 5 judges whether an input signal received through the antenna 1 is monitored, in step A3. When an input signal is monitored in step A3, the second device 3 judges whether an electric field of the monitored input signal has a level equal to or smaller than a threshold level, in step A4.

If an electric field of the monitored input signal is judged in step A4 not to have a level equal to or smaller than the threshold level, the ordinary mode is kept established in step A2. If an electric field of the monitored input signal is judged in step A4 to have a level equal to or smaller than the threshold level, the controller 5 judges in step A5 whether an input signal is monitored or not.

When an input signal is monitored in step A5, step A2 and the subsequent steps are carried out again. That is, the ordinary mode is kept established. When an input signal is not monitored in step A5, step A6 is carried out. If an input signal is not monitored in step A3, steps A4 and A5 are skipped, and step A6 is carried out.

The controller 5 judges whether a period of time Tt longer than the period of time Tn (Tt>Tn) has passed or not in accordance with output signals transmitted from the timer 4, in step A6.

When the period of time Tt has not passed yet, step A2 and the subsequent steps are carried out again. That is, the ordinary mode is kept established. When the period of time Tt has already passed in step A6, step A7 is carried out.

In step A7, the ordinary mode in the first device 2 is changed to a power-saving mode where an input signal is monitored at every period of time Ts (Ts>Tn).

Then, the controller 5 judges whether an input signal received through the antenna 11 is monitored or not, in step A8. If an input signal is not monitored in step A8, the power-saving mode is kept established in step A7.

When an input signal is monitored in step A8, step A1 is carried out again.

An example of the above-mentioned operation of the apparatus is explained hereinbelow with reference to FIG. 6.

First, input signals are scanned in the ordinary mode where an interval Tn between scanning is set to be 10 seconds.

Figure 6:
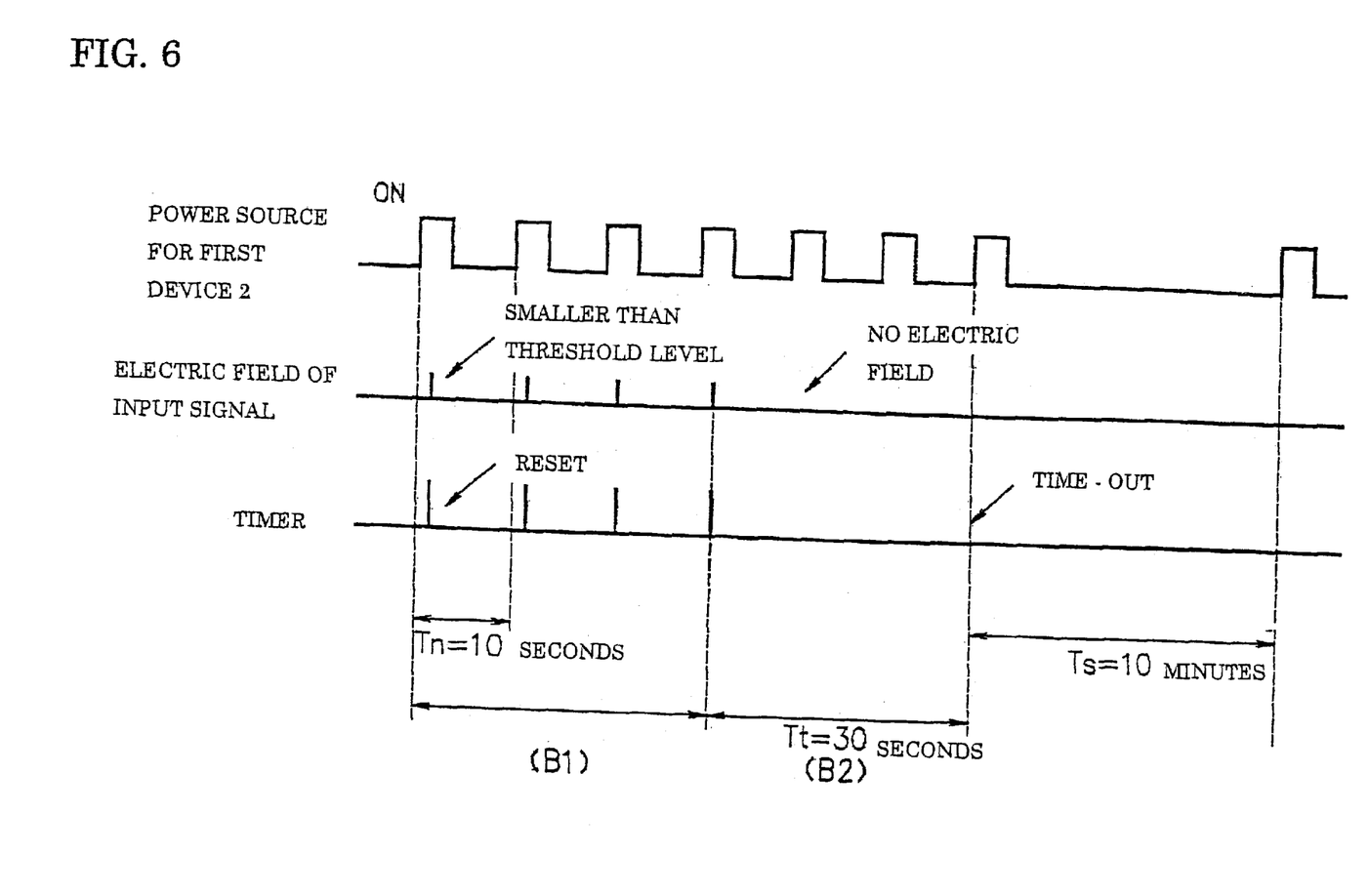
FIG. 6 illustrates waveforms of signals in the apparatus for scanning signals received by a wireless telephone, illustrated in FIG. 4.

If an electric field of the input signals is found, even if an electric field of the electric field has a level equal to or smaller than a threshold level which is set equal to 26 dB $\mu$V in the embodiment, as shown in FIG. 6 as a state B1, the ordinary mode is kept established.

Thereafter, if no electric field of the input signals is found, as shown in FIG. 6 as a state B2, the ordinary mode is changed to the power-saving mode where an interval Ts between scanning is set to be 10 minutes, to thereby scan input signals, after a period of time Tt, which is set to be 30 seconds in the present embodiment, has passed.

Steps A3 and A4 may be skipped.

Hereinbelow is explained an embodiment of a recording medium storing a program therein for accomplishing the above-mentioned apparatus for scanning signals received by a wireless telephone, or for carrying out the method of scanning signals received by a wireless telephone.

A recording medium storing a program for accomplishing the above-mentioned apparatus for scanning signals received by a wireless telephone or for carrying out the method of scanning signals received by a wireless telephone may be made by programming functions of the above-mentioned apparatus with a programming language readable by a computer, and recording the program in a recording medium such as CD-ROM, a floppy disc, a magnetic tape, and any other suitable means for storing a program therein.

A hard disc equipped in a server may be employed as a recording medium. It is also possible to accomplish the recording medium in accordance with the present invention by storing the above-mentioned computer program in a recording medium as mentioned above, and reading that computer program by other computers through a network.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-344599 filed on Dec. 15, 1997 including specification, claims, drawings and summary is incorporated herein by reference in its entirety.

What is claimed is:

1. An apparatus for scanning signals received by a wireless telephone, comprising:

(a) a monitor having a first monitor mode where an input signal received through an antenna is monitored at every first period of time and a second monitor mode where said input signal is monitored at every second period of time longer than said first period of time;

(b) a mode keeper for, while said monitor is set in said first monitor mode, keeping said monitor in said first monitor mode when any input signal, whether having electric field level either greater than or smaller than a threshold level, is monitored in a third period of time longer than said first period of time; and (c) a mode changer for, while said monitor is set in said first monitor mode, changing said first monitor mode to said second monitor mode when said input signal is not monitored in said third period of time.

2. An apparatus for scanning signals received by a wireless telephone, comprising:

(a) a monitor having a first monitor mode where an input signal received through an antenna is monitored at every first period of time and a second monitor mode where said input signal is monitored at every second period of time longer than said first period of time;

(b) a first mode keeper for, while said monitor is set in said first monitor mode, keeping said monitor in said first monitor mode when said input signal is monitored in a third period of time longer than said first period of time and when said input signal has a level equal to or greater than a threshold level;

(c) a second mode keeper for, while said monitor is set in said first monitor mode, keeping said monitor in said first monitor mode when any input signal, whether having electric field level either greater than or smaller than a threshold level, is monitored in said third period of time; and (d) a mode changer for, while said monitor is set in said first monitor mode, changing said first monitor mode to said second monitor mode when said input signal is not monitored in said third period of time.

3. An apparatus for scanning signals received by a wireless telephone, comprising:

(a) a monitor having a first monitor mode where an input signal received through an antenna is monitored at every first period of time and a second monitor mode where said input signal is monitored at every second period of time longer than said first period of time;

(b) a mode keeper for, while said monitor is set in said first monitor mode, keeping said monitor in said first monitor mode when any input signal, whether having electric field level either greater than or smaller than a threshold level, is monitored in a third period of time longer than said first period of time;

(c) a first mode changer for, while said monitor is set in said first monitor mode, changing said first monitor mode to said second monitor mode when said input signal is not monitored in said third period of time; and (d) a second mode changer for, while said monitor is set in said second monitor mode, changing said second monitor mode to said first monitor mode when said input signal is monitored in said second period of time.

4. A method of scanning signals received by a wireless telephone, comprising the steps of:

(a) establishing a first monitor mode where an input signal received through an antenna is monitored at every first period of time;

(b) keeping said first monitor mode, while said first monitor mode is established, when any input signal, whether having electric field level either greater than or smaller than a threshold level, is monitored in a second period of time longer than said first period of time; and (c) changing said first monitor mode to a second monitor mode where said input signal is monitored in a third period of time longer than said first period of time, while said first monitor mode is established, when said input signal is not monitored in said second period of time.

5. A method of scanning signals received by a wireless telephone, comprising the steps of:

(a) establishing a first monitor mode where an input signal received through an antenna is monitored at every first period of time;

(b) keeping said first monitor mode, while said first monitor mode is established, when any input signal, whether having electric field level either greater than or smaller than a threshold level, is monitored in a second period of time longer than said first period of time;

(c) changing said first monitor mode to a second monitor mode where said input signal is monitored in a third period of time longer than said first period of time, while said first monitor mode is established, when said input signal is not monitored in said second period of time; and (d) changing said second monitor mode to said first monitor mode, while said second monitor mode is established, when said input signal is monitored in said third period of time.

6. A recording medium readable by a computer, storing a program therein for causing a computer to act as an apparatus for scanning signals received by a wireless telephone, said apparatus comprising:

(a) a monitor having a first monitor mode where an input signal received through an antenna is monitored at every first period of time and a second monitor mode where said input signal is monitored at every second period of time longer than said first period of time;

(b) a mode keeper for, while said monitor is set in said first monitor mode, keeping said monitor in said first monitor mode when any input signal, whether having electric field level either greater than or smaller than a threshold level, is monitored in a third period of time longer than said first period of time; and (c) a mode changer for, while said monitor is set in said first monitor mode, changing said first monitor mode to said second monitor mode when said input signal is not monitored in said third period of time.

7. A recording medium readable by a computer, storing a program therein for causing a computer to act as an apparatus for scanning signals received by a wireless telephone, said apparatus comprising:

(a) a monitor having a first monitor mode where an input signal received trough an antenna is monitored at every first period of time and a second monitor mode where said input signal is monitored at every second period of time longer than said fire period of time;

(b) a first mode keeper for, while said monitor is set in said first monitor mode, keeping said monitor in said first monitor mode when said input signal is monitored in a third period of time longer than said first period of time and when said input signal has a level equal to or greater than a threshold level;

(c) a second mode keeper for, while said monitor is set in said first monitor mode, keeping said monitor in said first monitor mode when any input signal, whether having electric field level either greater than or smaller than a threshold level, is monitored in said third period of time; and (d) a mode changer for, while said monitor is set in said first monitor mode, changing said first monitor mode to said second monitor mode when said input signal is not monitored in said third period of time.

8. A recording medium readable by a computer, storing a program therein for causing a computer to act as an apparatus for scanning signals received by a wireless telephone, said apparatus comprising:

(a) a monitor having a first monitor mode where an input signal received through an antenna is monitored at every first period of time and a second monitor mode where said input signal is monitored at every second period of time longer than said first period of time;

(b) a first mode keeper for, while said monitor is set in said first monitor mode, keeping said monitor in said first monitor mode when any input signal, whether having electric field level either greater than or smaller than a threshold level, is monitored in a third period of time longer than said first period of time;

(c) a first mode changer for, while said monitor is set in said first monitor mode, changing said first monitor mode to said second monitor mode when said input signal is not monitored in said third period of time; and (d) a second mode changer for, while said monitor is set in said second monitor mode, changing said second monitor mode to said first monitor mode when said input signal is monitored in said second period of time.

9. A recording medium readable by a computer, storing a program therein for causing a computer to carry out a method of scanning signals received by a wireless telephone, said method comprising the steps of:

(a) establishing a first monitor mode where an input signal received through an antenna is monitored at every first period of time;

(b) keeping said first monitor mode, while said first monitor mode is established, when any input signal, whether having electric field level either greater than or smaller than a threshold level, is monitored in a second period of time longer than said first period of time; and (c) changing said first monitor mode to a second monitor mode where said input signal is monitored in a third period of time longer than said first period of time, while said first monitor mode is established, when said input signal is not monitored in said second period of time.

10. A recording medium readable by a computer, storing a program therein for causing a computer to carry out a method of scanning signals received by a wireless telephone, said method comprising the steps of:

(a) establishing a first monitor mode where an input signal received through an antenna is monitored at every first period of time;

(b) keeping said first monitor mode, while said first monitor mode is established, when any input signal, whether having electric field level either greater than or smaller than a threshold level, is monitored in a second period of time longer than said first period of time;

(c) changing said first monitor mode to a second monitor mode where said input signal is monitored in a third period of time longer than said first period of time, while said first monitor mode is established, when said input signal is not monitored in said second period of time; and (d) changing said second monitor mode to said first monitor mode, while said second monitor mode is established, when said input signal is monitored in said third period of time.

* * * * *